(12) United States Patent
Vontell

(10) Patent No.: US 8,622,694 B2
(45) Date of Patent: Jan. 7, 2014

(54) METHODS AND SYSTEMS FOR REMOVABLY SECURING REUSABLE PARTS TO REPLACEABLE PARTS

(75) Inventor: John H. Vontell, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 2260 days.

(21) Appl. No.: 11/513,695

(22) Filed: Aug. 31, 2006

(65) Prior Publication Data

US 2008/0053106 A1    Mar. 6, 2008

(51) Int. Cl.
*F01D 11/00* (2006.01)
*F16J 15/20* (2006.01)

(52) U.S. Cl.
USPC ........................................ 415/174.4; 277/540

(58) Field of Classification Search
USPC .................. 415/173.4, 174.2, 174.4; 277/534
See application file for complete search history.

(56) References Cited

U.S. PATENT DOCUMENTS

| 6,425,736 | B1 * | 7/2002 | McMahon et al. | 415/173.4 |
| 2007/0045967 | A1 * | 3/2007 | Park | 277/534 |
| 2008/0026142 | A1 * | 1/2008 | Vontell et al. | 427/207.1 |

OTHER PUBLICATIONS

Definition of "rubber", http://www.thefreedictionary.com/p/rubber.*

* cited by examiner

*Primary Examiner* — Melanie Hand
(74) *Attorney, Agent, or Firm* — Carlson, Gaskey & Olds P.C.

(57) ABSTRACT

A method of removably securing a reusable component to a replaceable component with a bonding agent is provided. The method includes, but is not limited to, preparing a first surface of the reusable component so that a bonding energy between the first surface and the bonding agent has a first level, preparing a second surface of the replaceable component so that a bonding energy between the second surface and the bonding agent has a second level, the second level being greater than the first level, and applying the bonding agent so that the bonding agent bonds the first and second surfaces to one another.

21 Claims, 3 Drawing Sheets

US 8,622,694 B2

METHODS AND SYSTEMS FOR REMOVABLY SECURING REUSABLE PARTS TO REPLACEABLE PARTS

BACKGROUND OF THE INVENTION

1. Field of the Invention

The present disclosure is related to systems having both reusable and replaceable parts. More particularly, the present disclosure is related to methods and systems for removably securing reusable parts to replaceable parts utilizing bonding agents.

2. Description of Related Art

Systems, such as power systems, including but not limited to, gas turbine engines consist of multiple components, which are made of various materials including metals and composites. In use, these components may need to be removably attached, e.g., adhesively bonded to one another in order to meet specific service requirements, ease of assembly, or other consideration.

During use, it is common for some of the components of the engine system to be damaged, e.g., during operation. Damage resulting from a number of sources may include hard body impact and erosion. In designing the engine systems, a main objective is to protect the more expensive and/or complex structures from damage so that they may be used throughout the full service period of the system. These structures are considered to be the reusable parts or components. Other components, however, will be subject to damage and may need to be replaced periodically. These are considered to be the replaceable parts or components.

When it is time to service the replaceable component and/or a connecting component that is attached to the reusable component via the bonding agent, the components must be separated. There are a number of ways to do this including chemical and/or mechanical separation. The chemical separation should be done in a way such that it is compatible with and does not damage the reusable part. The typical result, however, is that some bonding agent remains on the reusable part and/or that the connecting component remains bonded to the reusable part. The bonding agent must then be removed from the reusable part before the part can be used again. Removing the bonding agent requires additional expenses and can delay the return of the engine system into operational status, which is undesirable.

Thus, there exists a need for methods and systems for bonding reusable and replaceable components wherein, upon separation of the bond, the surface of the reusable component remains substantially free of the bonding agent compound. There is a further need for methods and systems that facilitate the separation of reusable and replaceable components.

BRIEF SUMMARY OF THE INVENTION

In accordance with the present disclosure, methods and systems for removably securing gas turbine engine components utilizing bonding agents are provided.

In one aspect, a method of removably securing a reusable part to a replaceable part with an bonding agent is provided that includes, but is not limited to, preparing a first surface of the reusable part so that a bond strength between the first surface and the bonding agent has a first level, and preparing a second surface of the replaceable part so that a bond strength between the second surface and the bonding agent has a second level, the second level being greater than said first level, and applying the bonding agent so that the bonding agent bonds the first and second surfaces to one another.

An engine assembly is also provided. There is a reusable component having a first surface bonded to a bonding agent with a first strength. There is also a replaceable component having a second surface bonded to the first surface via the bonding agent with a second bond strength. The second bond strength is greater, e.g., at least 25% larger than the first bond strength, however other ranges are contemplated in the present disclosure The above-described and other features and advantages of the present disclosure will be appreciated and understood by those skilled in the art from the following detailed description, drawings, and appended claims.

DETAILED DESCRIPTION OF THE INVENTION

Figure 1:
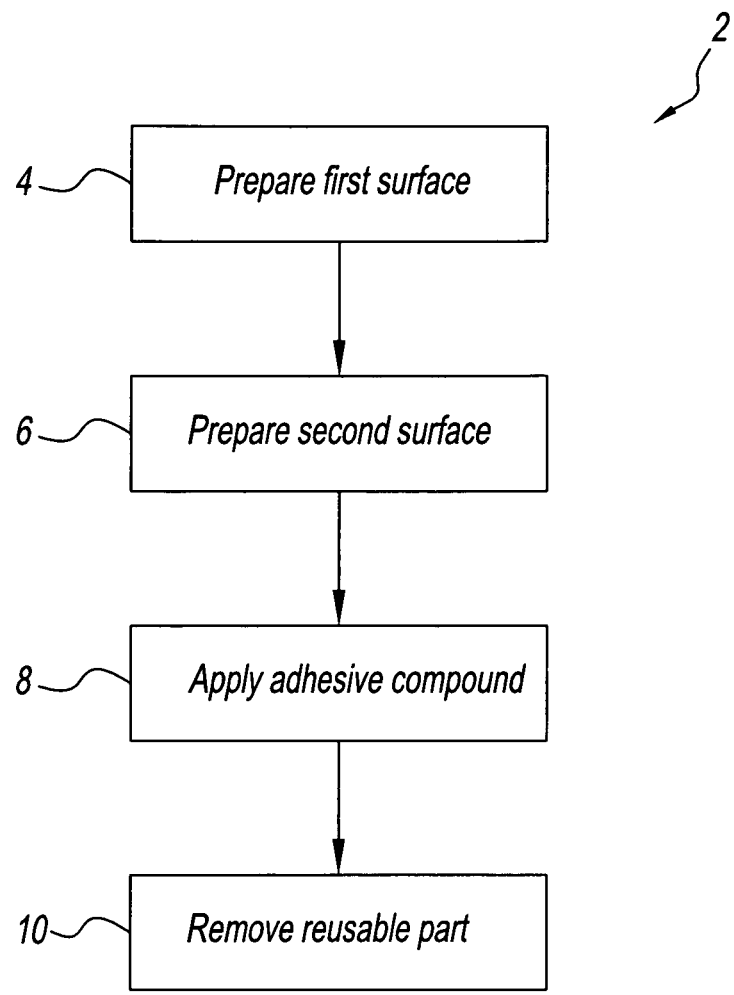
FIG. 1 is a block diagram of an exemplary embodiment of a method according to the present disclosure for removably securing a reusable component to a replaceable component in an engine system with a bonding agent.

Referring to the drawings and in particular to FIG. 1, an exemplary embodiment of a method according to the present disclosure for removably securing a reusable component to a replaceable component in an engine assembly with an adhesive or bonding agent (hereinafter "bonding agent") is generally illustrated as reference numeral 2. Advantageously, method 2 illustrates a way in which a bonding agent can effectively bond a reusable component to a replaceable component, as well as encapsulate other electrical, mechanical, and/or hydraulic connecting components. Additionally advantageous is that when the replaceable and reusable components are separated, substantially all of any remaining bonding agent is on the replaceable component and not on the reusable component. It should be understood by one of ordinary skill in the art that while the exemplary embodiment is described with respect to reusable and replaceable components of a gas turbine engine, the present disclosure contemplates the use of such methods and the like for other applications.

Method 2 includes a first preparation step 4. During first preparation step 4, a first surface of a reusable component is prepared so that the bond strength between the first surface and an bonding agent has a first level. Method 2 also includes a second preparation step 6. During second preparation step 6, a second surface of a replaceable part is prepared so that the bond strength between the second surface and the bonding agent has a second level that is greater than the first level. Of course, the sequence of steps 4 and 6 may be reversed or simultaneous. Method 2 includes an application step 8. During application step 8, an bonding agent is applied so that first and second surfaces are bonded to one another. Method 2 may also include a removal step 10, wherein the first surface of the reusable component is separated from the second surface of the replaceable component.

The first preparation step 4 can encompass any method sufficient such that the resultant bond strength between the first surface and the bonding agent, (e.g., the first level), is lower than the bonding energy between the second surface and the bonding agent, (e.g., the second level).

In one embodiment of the present disclosure, first preparation step 4 includes masking and applying a coating of primer or other bond-promoting coating to the first surface. The primer is used to enhance the bonding energy of a surface to a bonding agent. The primer is applied to certain areas of the first surface, while other areas of the first surface are not coated with the primer. By doing so, it is possible to achieve the desired bonding energy between the first surface and the bonding agent. It is contemplated by the present disclosure that the primer may be selected from the group consisting of silicone, urethane, polysulfide, fluorosilicone, fluorocarbon, epoxy, polyimide, silane, silanol, platinum or metal complex, polyester, cyanate ester, bismaleimide, phthalonitrile, and any combinations thereof.

In another embodiment, first preparation step 4 can include applying a thin layer of material to an area or areas of the first surface. Any type of material can be used that will adhere to the first surface and which has an inherently lower bonding energy with the bonding agent than the bonding energy between the first surface and the bonding agent. Suitable materials include, but are not limited to, fluorocarbon elastomers such as Viton® or Sifel®. In this embodiment, the material is applied to the first surface in any way such that it is affixed to the first surface. Optionally, masking may be applied to areas of the first surface where the material is not to be affixed. By applying the material to certain areas of the first surface and not to other areas, it is possible to achieve the desired bonding energy level between the first surface and the bonding agent.

In additional embodiments having first preparation step 4, the present disclosure contemplates the material itself being modified to achieve lower bonding energy with the bonding agent prior to applying to the first surface. Any method may be utilized that modifies the material such that a lower bonding energy results between the material and the bonding agent compound. This may include, for example, increasing the amount of voids by utilizing glass micro balloon filled elastomer.

In another embodiment, first preparation step 4 includes modifying the first surface of the reusable component by plasma etching such that the bonding energy between the first surface and the bonding agent compound is more than the bonding energy between the second surface and the bonding agent compound. Other types of etching or roughening techniques may also be utilized, such as, for example, chemical etching, as well as other types of machining techniques, in order to increase the bonding energy between the bonding agent compound and the first surface.

In another embodiment, first preparation step 4 includes applying a polymer to the first surface. The polymer has inherent properties so as to achieve low bond strengths with the bonding agent compound at temperatures which exceed the maximum service temperature but do not exceed the maximum short term temperature limits of the reusable component. Any polymer displaying suitable properties may be used. For example, it is contemplated that a Viton® polymer surface modifier may be applied to the first surface of a reusable part that is made of either titanium metal or a bismaleimide polymer matrix composite. For removal/debonding of the joined parts, heating the assembly to 450 degrees farenheit would significantly reduce the Viton® strength without damaging the reusable part.

In additional embodiments, it is contemplated by the present disclosure that the reusable component may be a composite. The bonding energy between the first surface and the bonding agent compound may be decreased by modifying the surface ply of the area. In one embodiment, during fabrication, a low surface energy specialty fabric woven from all or partially low surface energy fluoropolymer fibers resulting in possible control of the resultant surface energy may be applied to the desired area(s) of the first surface. It is contemplated that the flouropolymer fibers may include Teflon®. In additional embodiments, thermoplastics, such as polyethylene and polypropylene, may be combined with high surface energy fibers such as glass or graphite to yield one surface having a predominately low bonding energy and a second surface that exhibits a predominately high bonding energy. It is contemplated that the thermoplastic melt temperature is above the component service temperature. Advantageously, when using these techniques, one is able to avoid the various costs associated with masking. Additionally, the melt temperature of the thermoplastic may allow for removal of the replaceable component by heating the component and, thereby reducing the bonding energy.

In addition to each of the methods utilized in the various embodiments of first preparation step 4 discussed above, it should be recognized that any combination of these methods may be utilized such that the bonding energy of the first level is less than the second level.

Method 2 includes a second preparation step 6. During second preparation step 6, a second surface of a replaceable part is prepared so that the bonding energy between the second surface and the bonding agent compound has a second level that is greater than the first level. Second preparation step 6 can encompass a variety of methods. It is contemplated by the present disclosure that the second surface will be prepared utilizing good bonding practices accepted by industry.

In one embodiment, it is contemplated that the first and second preparation steps 4, 6 prepare the surfaces such that the bonding energy of the first level will be at least 50% less than the second level. In an alternative embodiment, it is contemplated that first and second preparation steps 4, 6 prepare the surfaces such that the first level will be at least 25% less than the second level. However, the present disclosure contemplates choosing other first and second levels based upon the particular environment of the components and other such factors.

Method 2 includes an application step 8 wherein the bonding agent compound is applied to the engine system such that the bonding agent compound bonds the first and second surfaces to one another. It is contemplated by the present disclosure that the bonding agent compound may be applied by any method sufficient so that the bonding agent compound bonds the first and second surfaces to one another. This may include, but is not limited to, application by any type of manual or automated process, or any combination thereof. For example, it is contemplated that the bonding agent may be applied by spray. After the bonding agent has been applied, the components are ready for service and can be used until either a wear limit is reached or the reusable component is damaged.

In an additional embodiment, method 2 includes a removal step 10 wherein the reusable component is removed from the replaceable component, for example, when the wear limit or life cycle of the part has been reached or removal is desired for another reason. It is contemplated by the present disclosure, that any method sufficient to accomplish this will suffice. For example, in one embodiment a physical stress is applied to the bonding agent. The physical stress may be in the form of a sheering force, peeling force, torque force, or any combinations thereof. Additionally, it is foreseen that this force may be applied either manually or mechanically.

In an additional embodiment, removal step 10 includes utilizing heat for removing the replaceable component from the reusable component. The heat may be applied either externally or internally. For example, in one embodiment, the heat may be applied by an electric heater. Additionally, the present disclosure contemplates other removal techniques, such as, for example, introducing a substance that breaks or otherwise alters the bond between the first surface and the bonding agent allowing for removal. Such other removal techniques may be used alone or in combination with the removal techniques described above, such as, for example, applying a physical stress in combination with applying a bond-altering substance. Any bond-altering substance should not damage the reusable component and preferably should allow for substantial removal of the bonding agent from the first surface of the reusable component. The bond-altering substance can be chosen to react with the particular bond formed between the first surface (e.g., a first surface coated with a reactive primer or polymer) and the bonding agent while being substantially non-reactive with the second surface and the bonding agent. For example, Viton®, which is commercially available from Dupont, can be used as a surface modifier and then later solvated or otherwise broken-down, such as, for example, by ketone solvents for removal of the reusable part from the replaceable part. Such a chemical removal process can be employed in combination with other removal processes, such as in combination with the application of heat or force.

It is contemplated that after removal of the reusable component from the replaceable component, the amount of bonding agent removed from the first surface of the reusable component is at least 90%, preferably 95%, and most preferably 99%, and any subranges therebetween.

Figure 2:
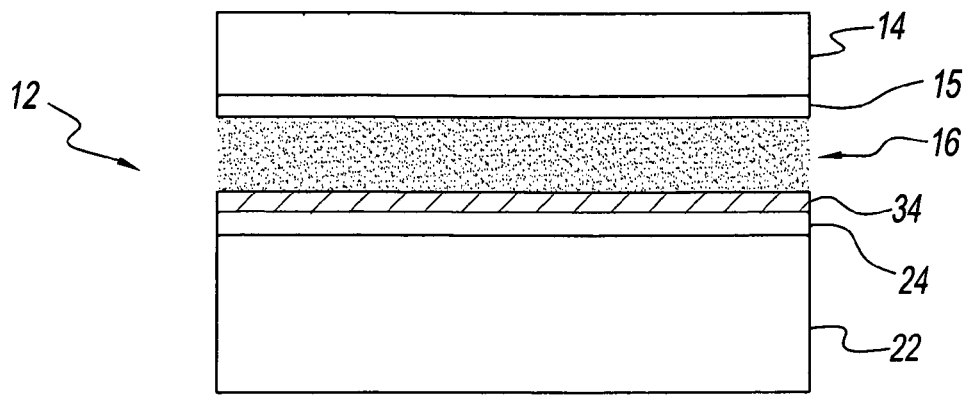
FIG. 2 is a sectional view of a portion of an exemplary embodiment of an engine system according to the present disclosure.

Referring now to FIG. 2, an exemplary embodiment of a portion of an engine system according to the present disclosure is generally illustrated as reference numeral 12. Advantageously, engine system 12 is configured so as to allow for removably bonding components.

Engine system 12 includes a reusable component 22 having a first surface 24, a replaceable component 14 having a second surface 15, and a bonding agent 16 to removably bond the reusable and replaceable components 22, 14. Advantageously, when reusable component 22 is removed from replaceable component 14, substantially all of bonding agent 16 remains on replaceable component 14.

Replaceable component 14 may be made out of any material having sufficient properties suitable for its function in engine system 12. For example, replaceable component 14 may be a metal, composite, plastic, or any combination thereof. Second surface 15 has been prepared utilizing good bonding practices that are accepted by industry.

Bonding agent 16 may be of any type suitable for bonding to both first surface 24 and second surface 15. In one embodiment, bonding agent 16 may be selected from the group consisting of silicone, urethane, rubber, polysulfide, fluorosilicone, fluorocarbon, and any combinations thereof. In additional embodiments, reusable component 22 may also be electrically and/or hydraulically connected to replaceable component 14. Here, it is often desired that bonding agent 16 also be used to secure the electrical and/or hydraulic connecting component, such as a wire or hydraulic fluid line, against vibration, as well as to provide vibration, electrical, and/or environmental isolation to connecting component 18.

Reusable component 22 may be made out of any material having sufficient properties suitable for its function in engine system 12. For example, reusable component 22 may be a metal, composite, plastic, or any combination thereof. First surface 24 has been modified so that the bonding energy between the first surface and bonding agent 16 is less than the bonding energy between second surface 15 and the bonding agent.

Figure 3:
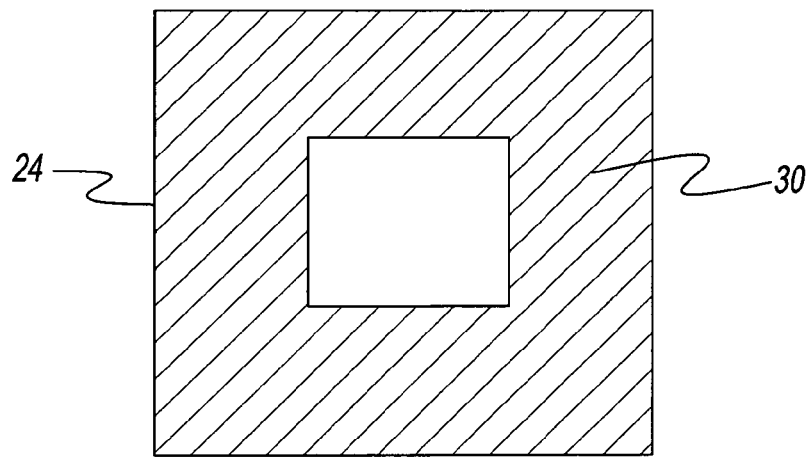
FIG. 3 is a top view of an exemplary embodiment of a modified surface of a reusable component in an engine system according to the present disclosure.

Referring now to FIG. 3, one embodiment of the present disclosure is shown wherein first surface 24 has an area that is coated with primer 30. Primer 30 has been applied to an area(s) where high bonding energy between first surface 24 and bonding agent 16 is desired. Areas of first surface 24 where lower bonding energy is desired have not been coated with the primer or do not have the primer exposed for bonding to the bonding agent 16.

Figure 4:
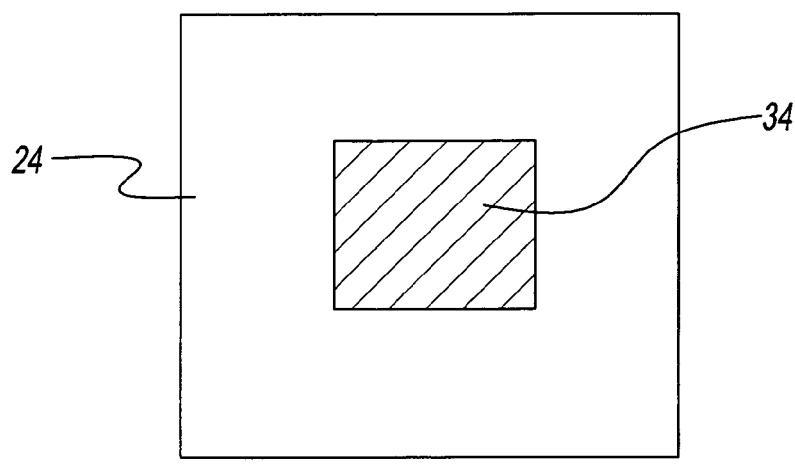
FIG. 4 is a top view of an alternate exemplary embodiment of a modified surface of a reusable component in an engine system according to the present disclosure.

Referring to FIG. 4, a surface modifier 34 has been applied to first surface 24 in an area where low bonding energy with bonding agent 16 is desired. In one embodiment of the present disclosure, surface modifier 34 may be a thin layer of material of any type suitable such that it can be affixed to first surface 24 and that displays properties of lower bonding energy with bonding agent 16 than the bonding energy between unmodified first surface 24 and the bonding agent. In one embodiment, the thin layer of material can be applied as a liquid which bonds to first surface 24. In an alternative embodiment, the thin layer of material can be applied as a film that is co-molded into the composite structure or is secondarily bonded with a bonding agent.

Suitable materials for use in the present disclosure include, but are not limited to, fluorocarbon elastomers, silicone, urethane, rubber, polysulfide, and fluorosilicone. In one embodiment of the present disclosure, the fluorocarbon elastomer is, by way of example, commercially available from Dupont under the trade name Viton®. In an additional embodiment, the fluorocarbon elastomer is, by way of example, commercially available from Shin-Etsu under the trade name Sifel®.

In an additional embodiment, it is contemplated that the material has been modified prior to application to first surface 24 so that it has a weakened bonding energy to bonding agent 16. For example, the material may be a glass micro balloon filled elastomer used in order to increase the voids in the material.

In another embodiment of the present disclosure, first surface 24 may be modified using plasma etching. Modified first surface 24 has a desired bonding energy with bonding agent 16 that is less than the bonding energy between second surface 15 and the bonding agent.

Figure 5:
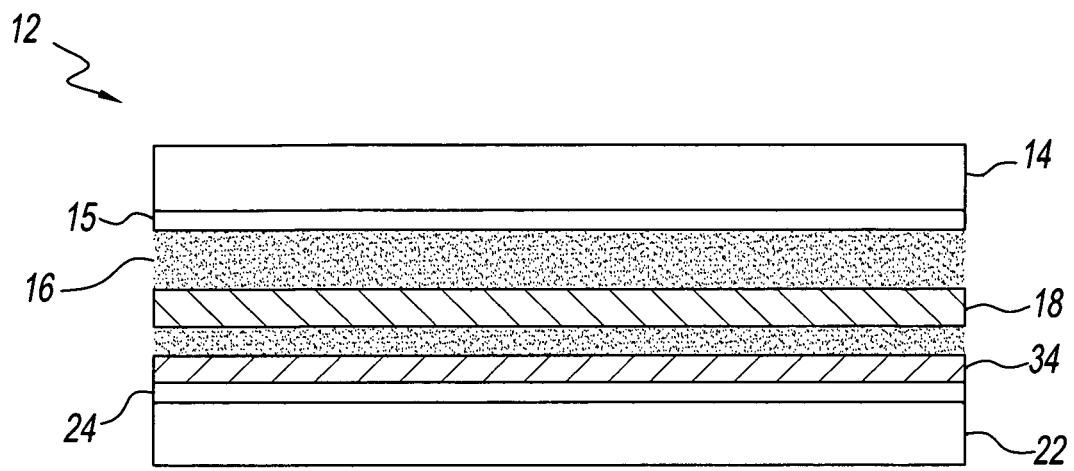
FIG. 5 is a sectional view of an alternate exemplary embodiment of an engine system according to the present disclosure.

Referring now to FIG. 5, engine system 12 can include a connecting component 18. Connecting component 18 may be any of a wide variety of components including, but not limited to, an electrical connection, electrical wiring and tubing, and tubing for aircraft fluids, such as oil and/or hydraulic fluids.

As illustrated in FIG. 5, connecting component 18 is encapsulated or otherwise housed by bonding agent 16 so that the bonding agent acts as a potting compound. Advantageously, bonding agent 16 creates a seal around connecting component 18 protecting it from damage due to environmental exposure and vibration. The potting compound is also used to resist mechanical loads of the engine and the operational temperatures of up to 400 degrees farenheit with excusions to 500 degrees farenheit. Additionally, because connecting component 18 is encapsulated by bonding agent 16, the connecting component will remain in the bonding agent when the reusable and replaceable components 22, 14 are separated. Because substantially all of bonding agent 16 remains affixed to replaceable component 14, connecting component 18 will be removed from reusable component 22 and can easily be replaced. This is advantageous when connecting component 18 needs to be replaced along with the replaceable part.

Figure 6:
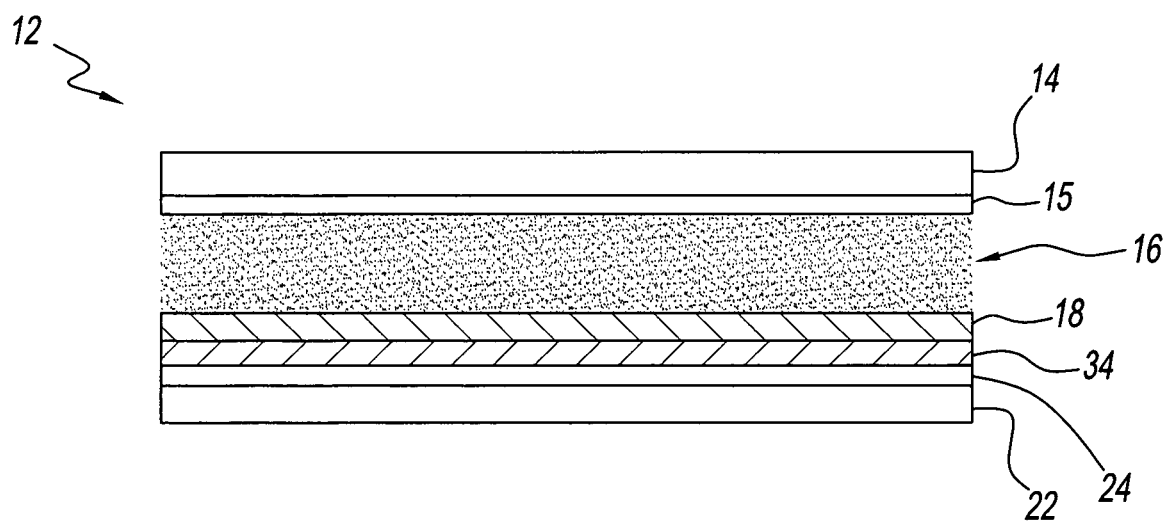
FIG. 6 is a sectional view of a portion of an alternate exemplary embodiment of a gas turbine engine system according to the present disclosure.

An additional embodiment of gas turbine system 12 is illustrated in FIG. 6. Here, connecting component 18 is affixed to first surface 24 and partially encapsulated by bonding agent 16. Advantageously, when reusable and replaceable components 14, 22 are separated, connecting component 18 remains with reusable component 22.

It should also be noted that the terms "first" and "second" and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A method of removably securing a reusable component to a replaceable component in a system with a bonding agent, the method comprising:
   preparing a first surface of the reusable component so that a bond strength between said first surface and the bonding agent has a first level;
   preparing a second surface of the replaceable component so that a bond strength between said second surface and the bonding agent has a second level, said second level being greater than said first level; and
   applying the bonding agent so that the bonding agent bonds said first and second surfaces together.

2. The method of claim 1, wherein the bonding agent is an adhesive.

3. The method of claim 1, wherein said first level is at least 50% less than said second level.

4. The method of claim 1, wherein said first level is at least 25% less than said second level.

5. The method of claim 1, further comprising removing the reusable component from the replaceable component, said second level being sufficient so that more than about 90% of the bonding agent is removed from said first surface of the reusable component.

6. The method of claim 5, wherein said second level is sufficient so that more than about 95% of the bonding agent is removed from said first surface of the reusable component.

7. The method of claim 5, wherein said second level is sufficient so that more than about 99% of the bonding agent is removed from said first surface of the reusable component.

8. The method of claim 1, wherein the step of preparing said first surface comprises applying a primer to said first surface.

9. The method of claim 8, wherein said primer is selected from the group consisting of silicone, urethane, polysulfide, fluorosilicone, fluorocarbon, epoxy, polyimide, silane, silanol, platinum or metal complex, polyester, cyanate ester, bismaleimide, phthalonitrile, and any combinations thereof.

10. The method of claim 1, wherein the step of applying the bonding agent comprises applying a potting compound selected from the group consisting of silicone, urethane, rubber, and any combinations thereof.

11. The method of claim 5, wherein the step of removing the reusable component comprises applying at least one of a physical stress, bond-altering substance or heat to the bonding agent.

12. The method of claim 1, wherein the step of applying the bonding agent comprises encapsulating a connecting component with the bonding agent.

13. The method of claim 1, wherein the system is a gas turbine engine.

14. The method of claim 1, wherein the system is a gas engine assembly.

15. An engine assembly, comprising:
   a bonding agent;
   a reusable component having a first surface bonded to said bonding agent with a first bond strength; and
   a replaceable component having a second surface bonded to said bonding agent with a second bonding strength, said second bond strength being at least 25% greater than said first bonding strength.

16. The engine system of claim 15, further comprising:
   a connecting component encapsulated by said bonding agent.

17. The engine system of claim 15, wherein said bonding agent is a potting compound selected from the group consisting of silicones, urethanes, rubber, and combinations thereof.

18. The engine system of claim 15, wherein said second bonding energy is sufficient so that more than about 90% of said bonding agent is removed from said first surface upon application of a removal force.

19. The engine system of claim 15, wherein said second bonding energy is sufficient so that more than about 95% of the bonding agent is removed from said first surface upon application of a removal force.

20. The method of claim 1, wherein the first surface and the second surface are the same size.

21. The engine system of claim 1, wherein the bonding agent is a non-silicone rubber.

* * * * *